UNITED STATES PATENT OFFICE.

AARON B. BROWN, OF WORCESTER, MASSACHUSETTS.

IMPROVEMENT IN LUBRICATING MATERIALS FOR USE IN WIRE-DRAWING.

Specification forming part of Letters Patent No. 215,875, dated May 27, 1879; application filed March 19, 1879.

*To all whom it may concern:*

Be it known that I, AARON B. BROWN, of Worcester, in the county of Worcester and Commonwealth of Massachusetts, have invented a new and useful Improvement in the Manufacture of Wire; and I hereby declare that the following is a description of the same.

My invention relates to an improved lubricating coating for application to wire, for the purpose of facilitating the operation of drawing the same through dies.

It has been customary to coat wire preparatory to drawing with a mixture of meal or flour and water; but such coating has been found lacking in adhesive quality when it has dried upon the wire, and it is therefore rapidly removed therefrom during the drawing operation, necessitating frequent applications. It is, besides, quite liable to become sour, putrefy and lose its lubricant quality, and thus its frequent fresh preparation is necessary. It has, moreover, been found that the meal or flour coating promotes oxidation or rust of the wire while it is drying upon the same.

It is the object of my invention to overcome these disadvantages attendant upon the meal or flour coating; and to this end it consists in an improved wire coating or bath composed of a mixture of a solution of alkaline phosphate and meal or flour. In preparing this coating or bath, I dissolve the alkaline phosphate (such as the phosphate of soda or the double phosphate of soda and ammonia) in a meal or flour coating, prepared in the ordinary way, by mixing together meal or flour and hot water, or by dissolving the phosphatic alkaline salts in water, and then using this solution in mixing the meal or flour as plain water is usually used.

The quantity of the salts used in thus preparing the coating for wire can be considerably varied without materially changing the nature of the coating or departing from my invention.

I find in practice that from one-fourth of a pound to a pound and a half of the salt-crystals mixed with one gallon of the ordinary meal or flour solution will make an effective coating according to my invention.

The quantity of the salts used should vary according to the size of the wire to be coated. The quantity of meal or flour used should also vary with the size of the wire. The smaller the wire to be coated the less of each kind of the material should be put into a gallon of water in preparing the coating.

My improved coating can be used by dipping or passing the wire through a bath of the same, and then allowing it to dry and crystallize upon the wire before drawing the coated wire through a die; or it may be used as a bath, from which the wire may be led direct to and through the die, as is now the practice with the meal or flour coating and other lubricants.

I find my improved coating much more adhesive than the simple mixture of flour or meal and water, thereby enabling the wire to be drawn through the die several times more with one coating than is practicable with the old mixture referred to, and obviating the necessity of so frequently recoating. Further, the phosphate alkali acts as an antiseptic, and prevents the mixture from putrefying or becoming sour and worthless in a short time, so that I am enabled to keep a large quantity of the coating on hand for ready use or sale.

I also find that the alkaline phosphates act, in conjunction with the meal or flour coating, to make a much more efficient lubricant than the mixture of meal or flour and water alone, and that the said alkaline phosphates prevent oxidation, and obviate the hitherto well-known and very objectionable tendency of all meal or flour coatings to rust the wire.

Having now described my invention and the mode of preparing and using the same, I claim—

The improved wire coating or bath herein described, the same consisting of a mixture of a solution of alkaline phosphate and meal or flour, substantially as set forth.

AARON B. BROWN.

Witnesses:
E. C. FAIRCHILD,
HORACE S. BRIGGS.